(12) United States Patent
Kamada (10) Patent No.: US 8,057,338 B2
(45) Date of Patent: Nov. 15, 2011

(54) BICYCLE SPROCKET APPARATUS WITH REINFORCEMENT BETWEEN SPROCKETS

(75) Inventor: Kenji Kamada, Abeno-ku (JP)

(73) Assignee: Shimano, Inc., Sakai-ku, Sakai (JP)

( * ) Notice: Subject to any disclaimer, the term of this patent is extended or adjusted under 35 U.S.C. 154(b) by 1078 days.

(21) Appl. No.: 11/162,132

(22) Filed: Aug. 30, 2005

(65) Prior Publication Data

US 2007/0049436 A1 Mar. 1, 2007

(51) Int. Cl.
*F16H 55/30* (2006.01)
(52) U.S. Cl. ............... 474/160; 474/152; 474/164
(58) Field of Classification Search .......... 474/152, 474/158, 160, 164; B62M 9/10; F16H 55/30
See application file for complete search history.

(56) References Cited

U.S. PATENT DOCUMENTS

| | | | |
|---|---|---|---|
| 3,082,637 A * | 3/1963 | Paxton | 474/162 |
| 3,815,439 A | 6/1974 | Tarutani | |
| 3,919,898 A * | 11/1975 | Sugino | 74/594.2 |
| 4,296,850 A * | 10/1981 | Isobe | 192/64 |
| 5,026,329 A * | 6/1991 | Diekevers | 474/162 |
| 5,194,051 A | 3/1993 | Nagano | |
| 5,935,034 A * | 8/1999 | Campagnolo | 474/160 |
| 6,102,821 A | 8/2000 | Nakamura | |
| 6,176,798 B1 | 1/2001 | Nakamura | |
| 7,854,673 B2 * | 12/2010 | Oseto et al. | 474/82 |
| 2003/0153423 A1 | 8/2003 | Smith | |
| 2004/0070166 A1 | 4/2004 | Valle | |
| 2004/0121867 A1 | 6/2004 | Reiter | |
| 2005/0009654 A1 * | 1/2005 | Kanehisa et al. | 474/152 |
| 2005/0090349 A1 * | 4/2005 | Lee | 474/160 |
| 2006/0172840 A1 * | 8/2006 | Kamada | 474/152 |
| 2008/0004143 A1 * | 1/2008 | Kanehisa et al. | 474/160 |
| 2008/0058144 A1 * | 3/2008 | Oseto et al. | 474/160 |
| 2009/0042681 A1 * | 2/2009 | Dal Pra' et al. | 474/160 |

FOREIGN PATENT DOCUMENTS

| | | |
|---|---|---|
| DE | 2243416 A1 | 3/1974 |
| DE | 103 42 638 A1 | 4/2005 |
| EP | 1074462 B1 | 5/2004 |
| WO | 97-18124 A1 | 5/1997 |

OTHER PUBLICATIONS

European Search Report for EP 06116935.5, the European application that corresponds to this application, dated Dec. 30, 2009.

* cited by examiner

*Primary Examiner* — Bradley King
*Assistant Examiner* — Thomas Irvin
(74) *Attorney, Agent, or Firm* — James A. Deland (57) ABSTRACT

A bicycle sprocket apparatus comprises a sprocket support, a first sprocket coupled to the sprocket support at a plurality of circumferentially spaced first sprocket mounting locations, a second sprocket coupled to the sprocket support at a plurality of circumferentially spaced second sprocket mounting locations, and a reinforcement member other than the sprocket support. The reinforcement member is disposed between the first sprocket and the second sprocket between a pair of the first sprocket mounting locations and between a pair of the second sprocket mounting locations.

21 Claims, 12 Drawing Sheets

BICYCLE SPROCKET APPARATUS WITH REINFORCEMENT BETWEEN SPROCKETS

BACKGROUND OF THE INVENTION

The present invention is directed to bicycles and, more particularly, to a bicycle sprocket apparatus with reinforcement between sprockets.

Many bicycles have derailleur operated transmissions. Such transmissions usually include a plurality of front sprockets and a plurality of rear sprockets, wherein the plurality of front sprockets are mounted for rotation coaxially with the pedal cranks, and the plurality of rear sprockets are mounted for rotation coaxially with the rear wheel. A front derailleur is mounted to the bicycle frame in close proximity to the plurality of front sprockets to selectively engage a chain with one of the plurality of front sprockets, and a rear derailleur is mounted to the bicycle frame in close proximity to the plurality of rear sprockets to selectively engage the chain with one of the plurality of rear sprockets. A shift control device operated by the rider may manually or automatically control the front and rear derailleurs.

Adjacent pairs of the plurality of front or rear sprockets may be connected together by a sprocket support that comprises a plurality of radially extending mounting arms. Each mounting arm includes a sprocket mounting portion disposed between its corresponding pair of sprockets, and a fastener is used to fasten the pair of sprockets to the mounting portion. The number of mounting arms must be sufficient to firmly mount the sprockets to withstand the rotational force of the chain and to prevent lateral bending of the sprockets. On the other hand, it also is desirable to minimize the number of mounting arms to save weight. While a smaller number of mounting arms may sufficiently accommodate the rotational force of the chain, reducing the number of mounting arms also reduces lateral support between the sprockets, thus increasing the risk of lateral deflection of the sprockets caused by the chain.

SUMMARY OF THE INVENTION

The present invention is directed to various features of a bicycle sprocket assembly. In one embodiment, a bicycle sprocket apparatus comprises a sprocket support, a first sprocket coupled to the sprocket support at a plurality of circumferentially spaced first sprocket mounting locations, a second sprocket coupled to the sprocket support at a plurality of circumferentially spaced second sprocket mounting locations, and a reinforcement member other than the sprocket support. The reinforcement member is disposed between the first sprocket and the second sprocket between a pair of the first sprocket mounting locations and between a pair of the second sprocket mounting locations. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
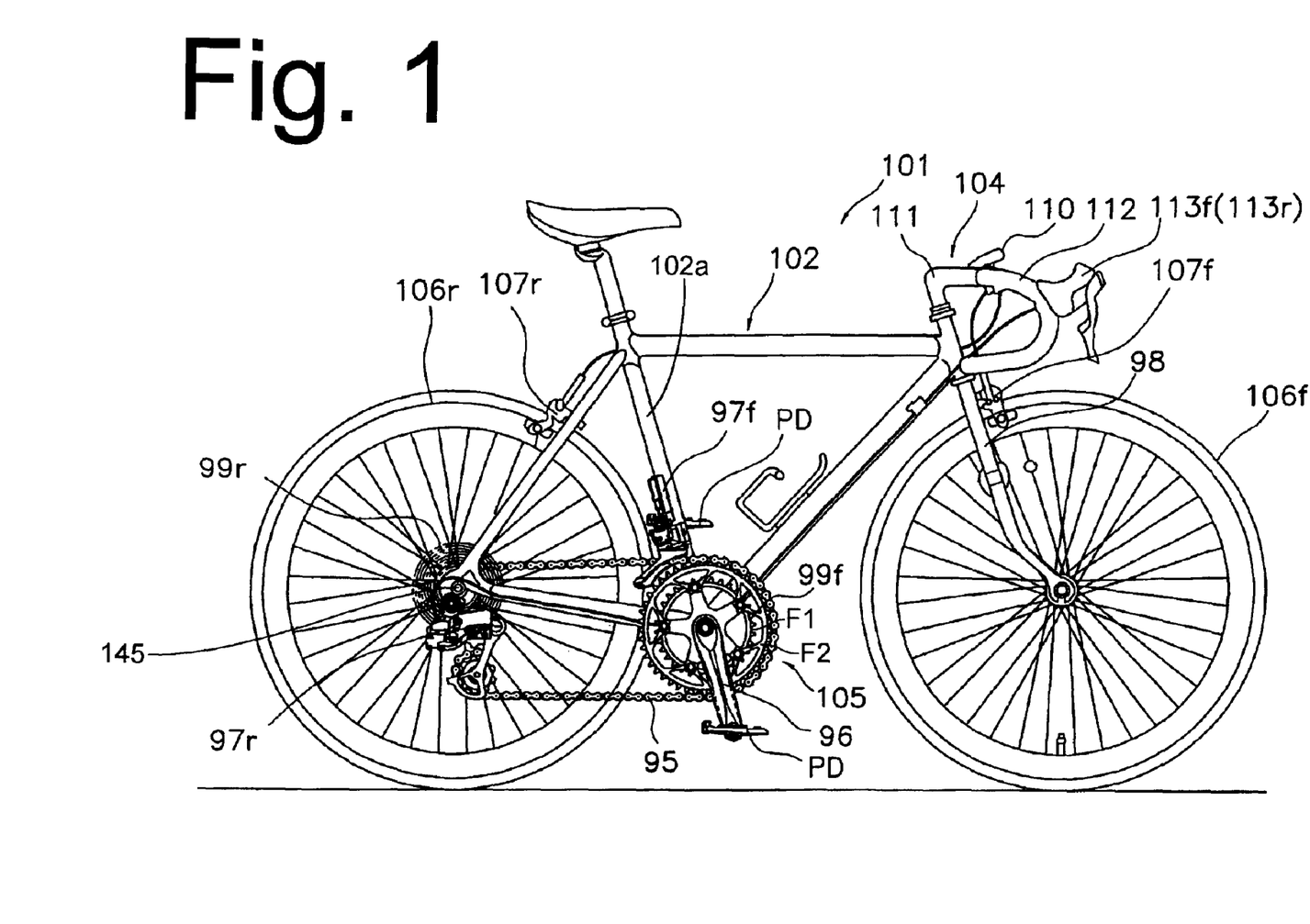
FIG. 1 is a side view of a particular embodiment of a bicycle.

FIG. 1 is a side view of a bicycle 101. Bicycle 101 is a road bicycle comprising a diamond-shaped frame 102, a front fork 98 rotatably mounted to frame 102, a handlebar assembly 104 mounted to the upper part of fork 98, a front wheel 106f rotatably attached to the lower part of fork 98, a rear wheel 106r rotatably attached to the rear of frame 102, and a drive unit 105. A front wheel brake 107f is provided for braking front wheel 106f, and a rear wheel brake 107r is provided for braking rear wheel 106r.

Figure 2:
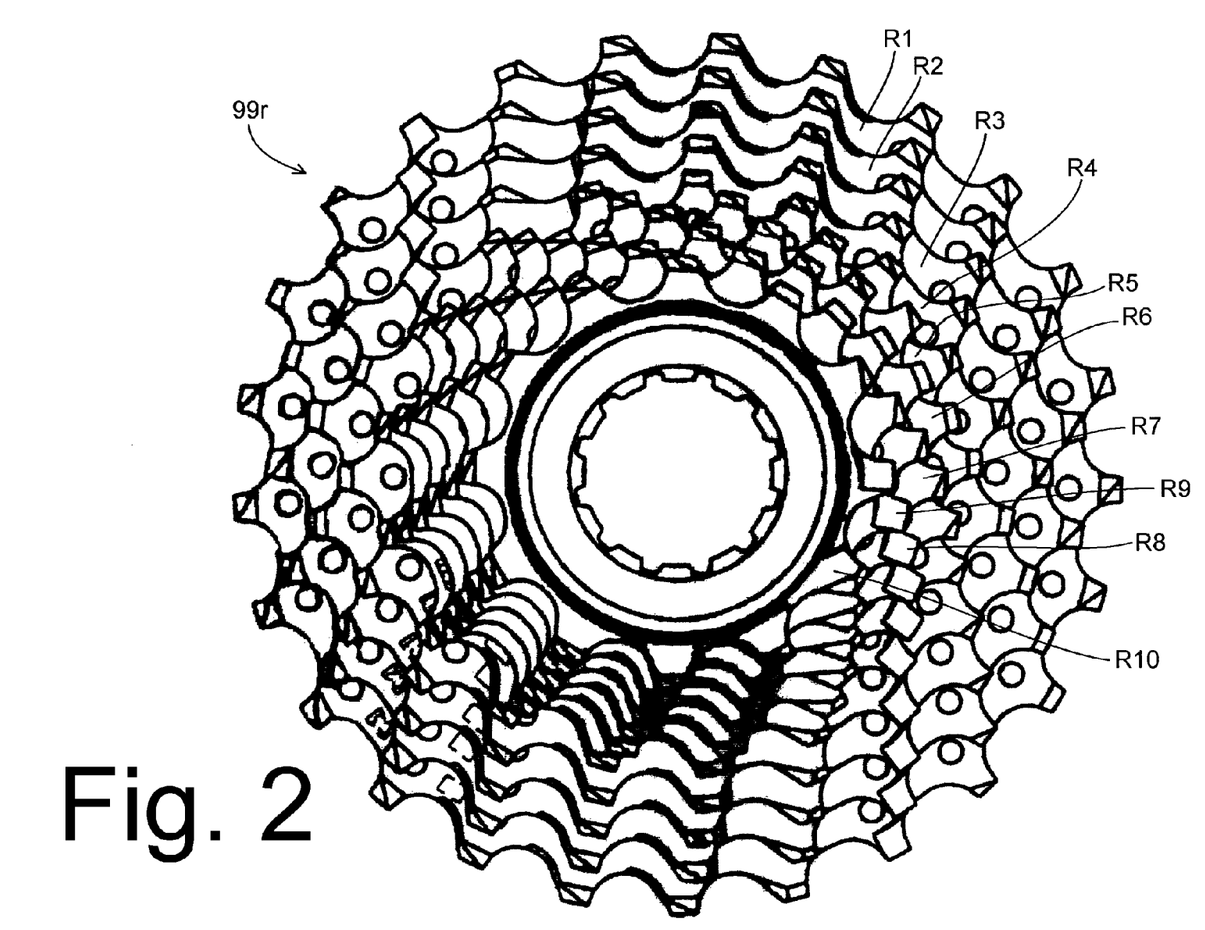
FIG. 2 is a more detailed view of a rear sprocket assembly.

Drive unit 105 comprises a chain 95, a front sprocket assembly 99f coaxially mounted with a crank 96 having pedals PD, an electrically controlled front derailleur 97f attached to a seat tube 102a of frame 102, a rear sprocket assembly 99r coaxially mounted with rear wheel 106r, and an electrically controlled rear derailleur 97r. Front sprocket assembly 99f comprises two coaxially mounted sprockets F1-F2, and rear sprocket assembly 99r comprises ten sprockets R1-R10 (FIG. 2) mounted coaxially with an axle 145 of rear wheel 106r. The number of teeth on front sprocket F1 is less than the number of teeth on front sprocket F2. As shown in FIG. 2, the numbers of teeth on rear sprockets R1-R10 gradually decrease from rear sprocket R1 to rear sprocket R10. As a result, rear sprocket R1 has the greatest number of teeth, and rear sprocket R10 has the least number of teeth. Front derailleur 97f moves to two operating positions to switch chain 95 between front sprockets F1 and F2, and rear derailleur 97r moves to ten operating positions to switch chain 95 among selected ones of the rear sprockets R1-R10.

A handlebar stem 111 is mounted to the upper portion of front fork 98, and a drop-style handlebar 112 is mounted to a front portion of handlebar stem 111. A combined brake and shift control device 113f is mounted to the left side of handlebar 112 to control the operation of front derailleur 97f and front brake 107f, and a combined brake and shift control device 113r is mounted to the right side of handlebar 112 to control the operation of rear derailleur 97r and rear brake 107r. An electronic control unit 110 provides the appropriate electrical signals to front derailleur 97f an rear derailleur 97r in response to the operation of the shift control devices in combined brake and shift control devices 113f and 113r in a known manner.

Figure 3:
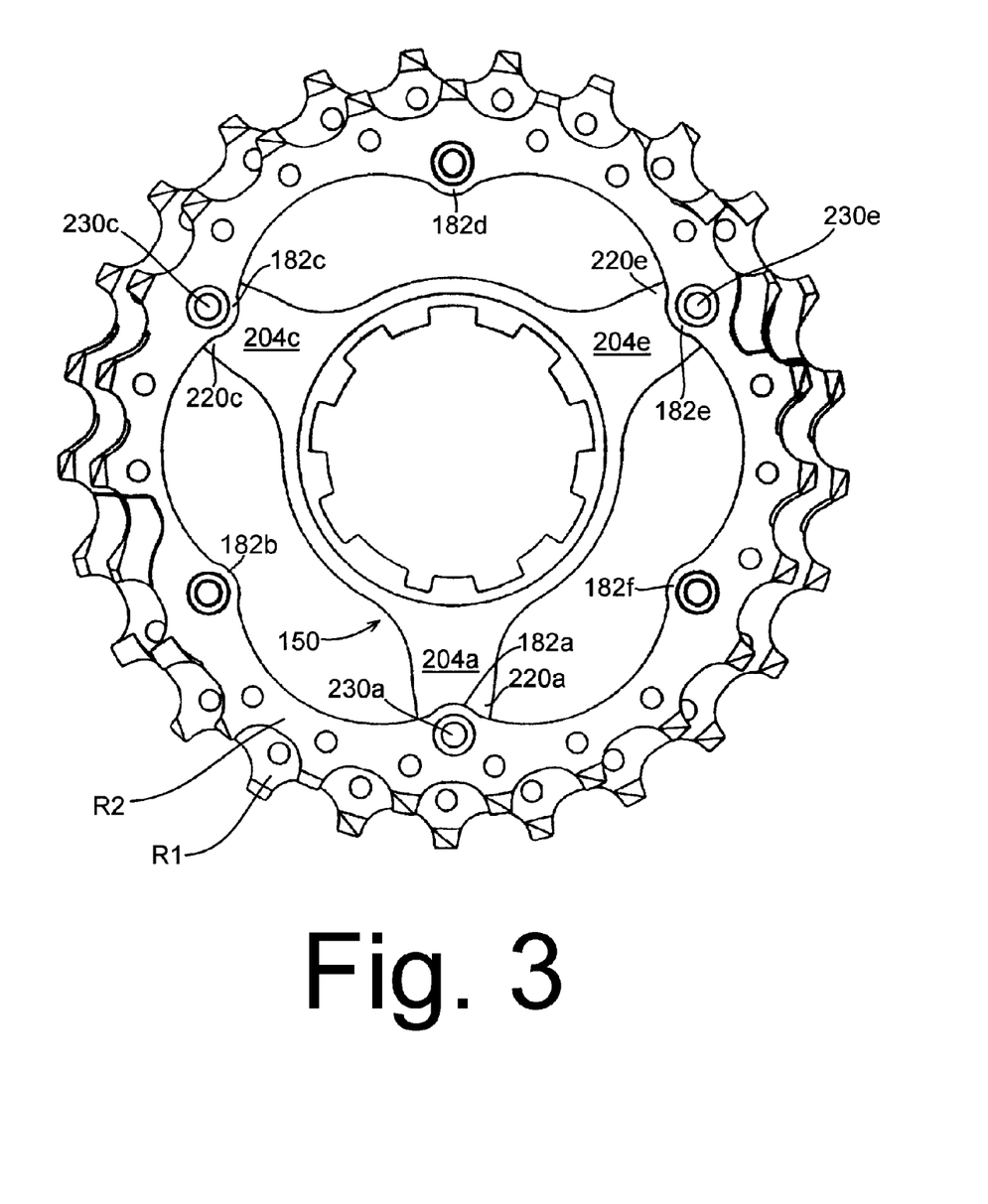
FIG. 3 is a front view of first and second sprockets connected together by a sprocket support.
Figure 4:
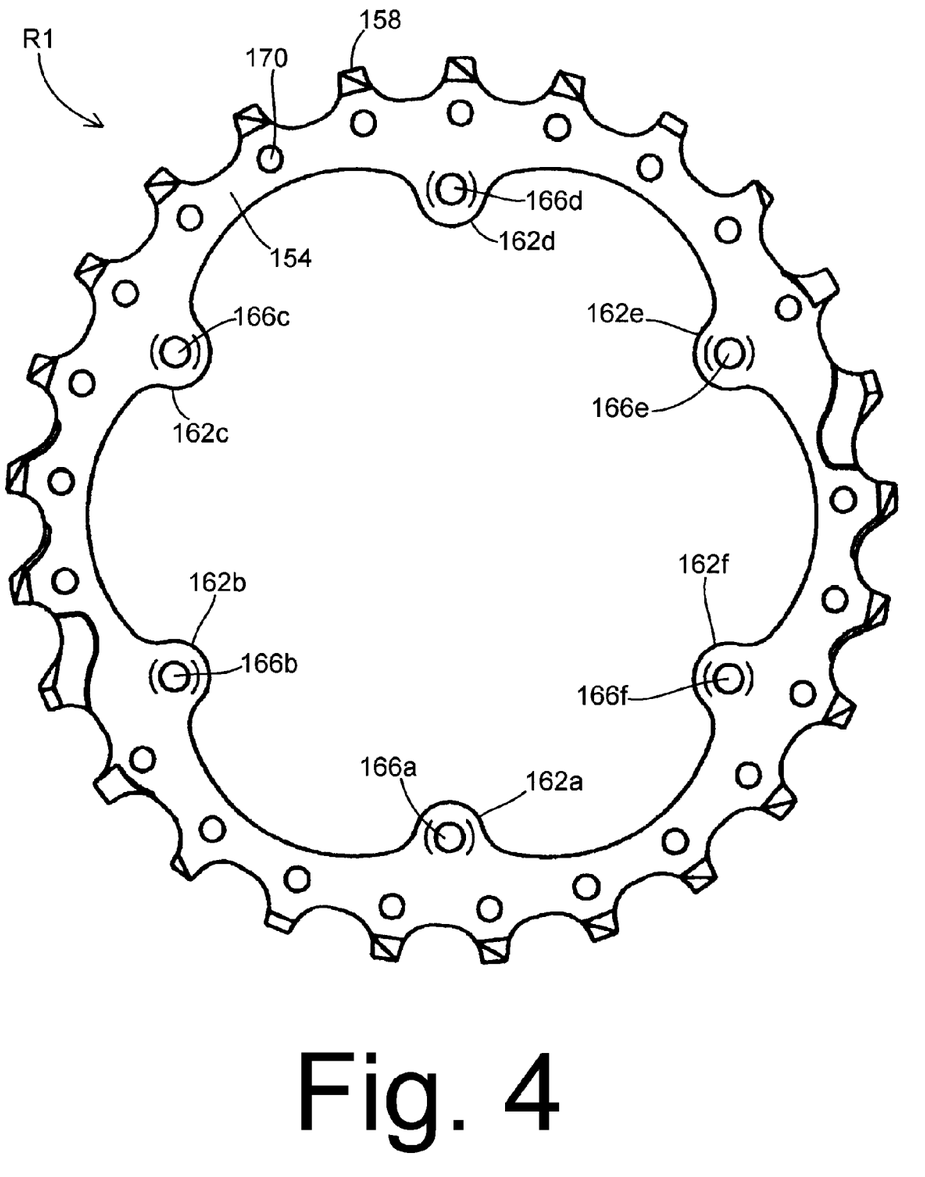
FIG. 4 is a detailed front view of the first sprocket.
Figure 5:
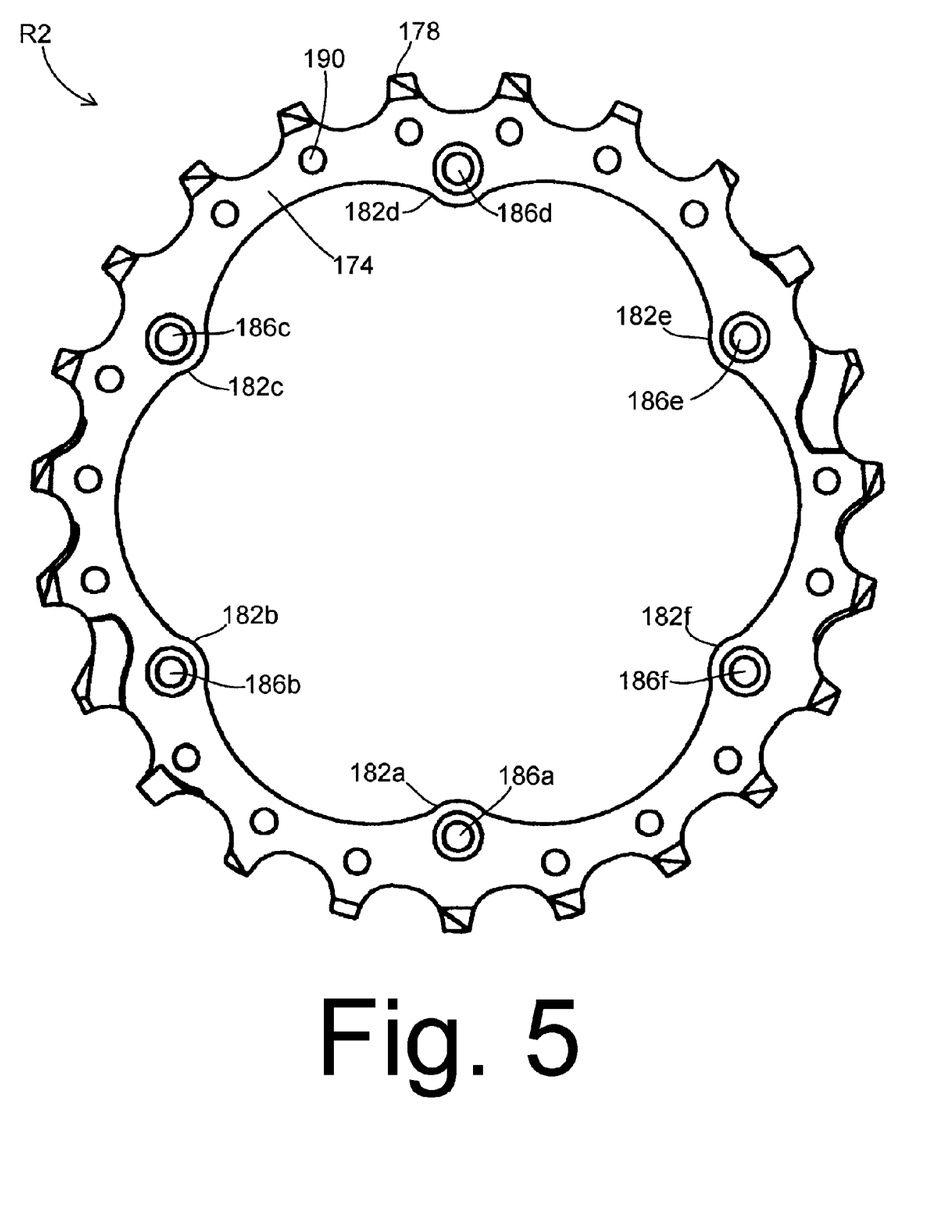
FIG. 5 is a detailed front view of the second sprocket.

FIG. 3 is a front view of rear sprockets R1 and R2 connected together by a sprocket support 150. As shown more clearly in FIG. 4, larger rear sprocket R1 comprises an annular sprocket body 154 having a plurality of radially outwardly extending sprocket teeth 158 and a plurality of radially inwardly extending sprocket mounting locations in the form of mounting portions 162a-162f with respective mounting openings 166a-166f. Sprocket body 154 includes a plurality of holes 170 to save weight. Similarly, as shown in FIG. 5, smaller rear sprocket R2 comprises an annular sprocket body 174 having a plurality of radially outwardly extending sprocket teeth 178 and a plurality of radially inwardly extending sprocket mounting locations in the form of mounting portions 182a-182f with respective mounting openings 186a-186f. Sprocket body 174 includes a plurality of holes 190 to save weight.

Figure 6:
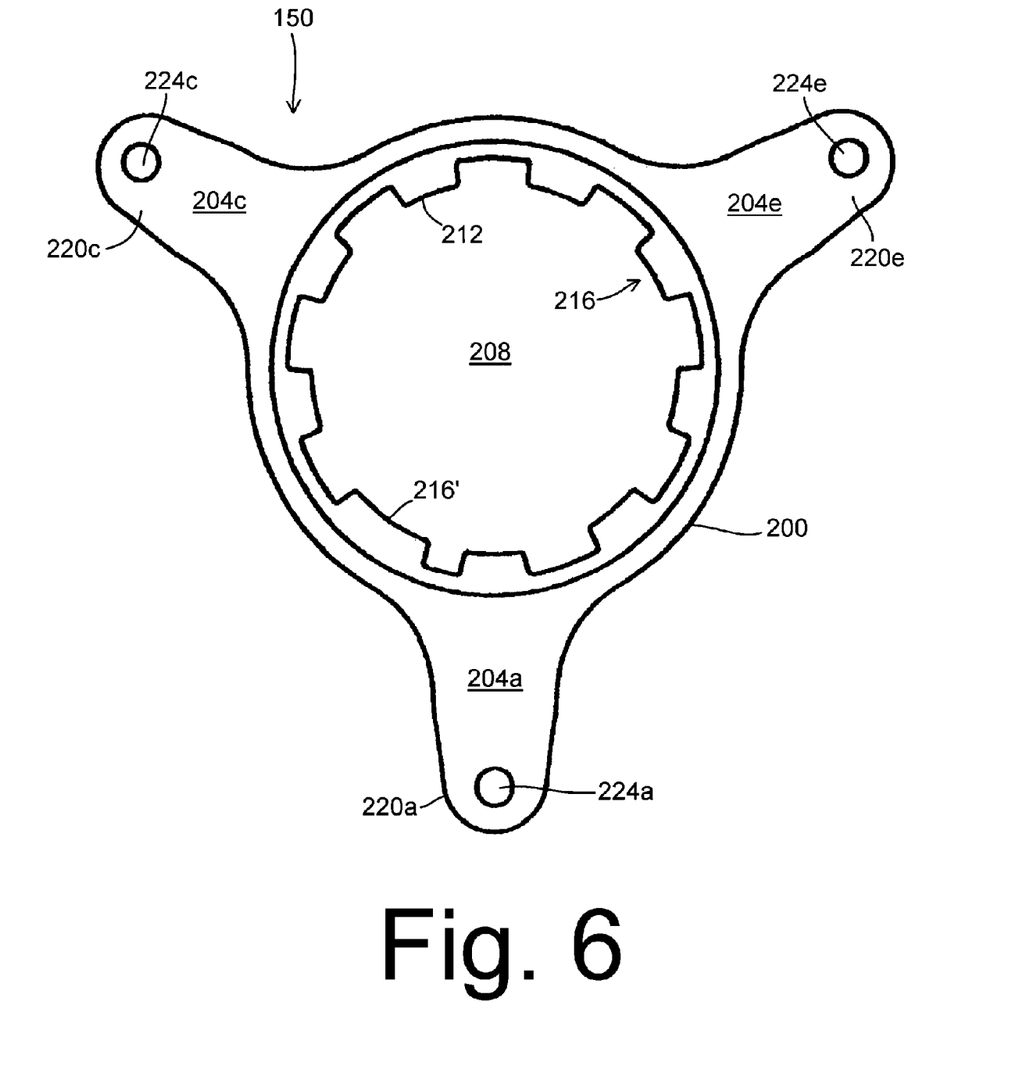
FIG. 6 is a detailed front view of the sprocket support.

As shown in FIG. 6, sprocket support 150 comprises an annular mounting boss 200 and a plurality of radially outwardly extending sprocket mounting arms 204a, 204c and 204e. Mounting boss 200 has a central opening 208 dimensioned to receive therein a conventional sprocket mounting sleeve (not shown) of a conventional freehub mechanism. An inner peripheral surface 212 of mounting boss 200 defines a plurality of splines 216 that engage a corresponding plurality of splines on the sprocket mounting sleeve of the freehub mechanism. A positioning spline 216' has a different width from the other splines 216 so that mounting boss 200 may be mounted to the sprocket mounting sleeve at a predetermined rotational position.

Figure 7:
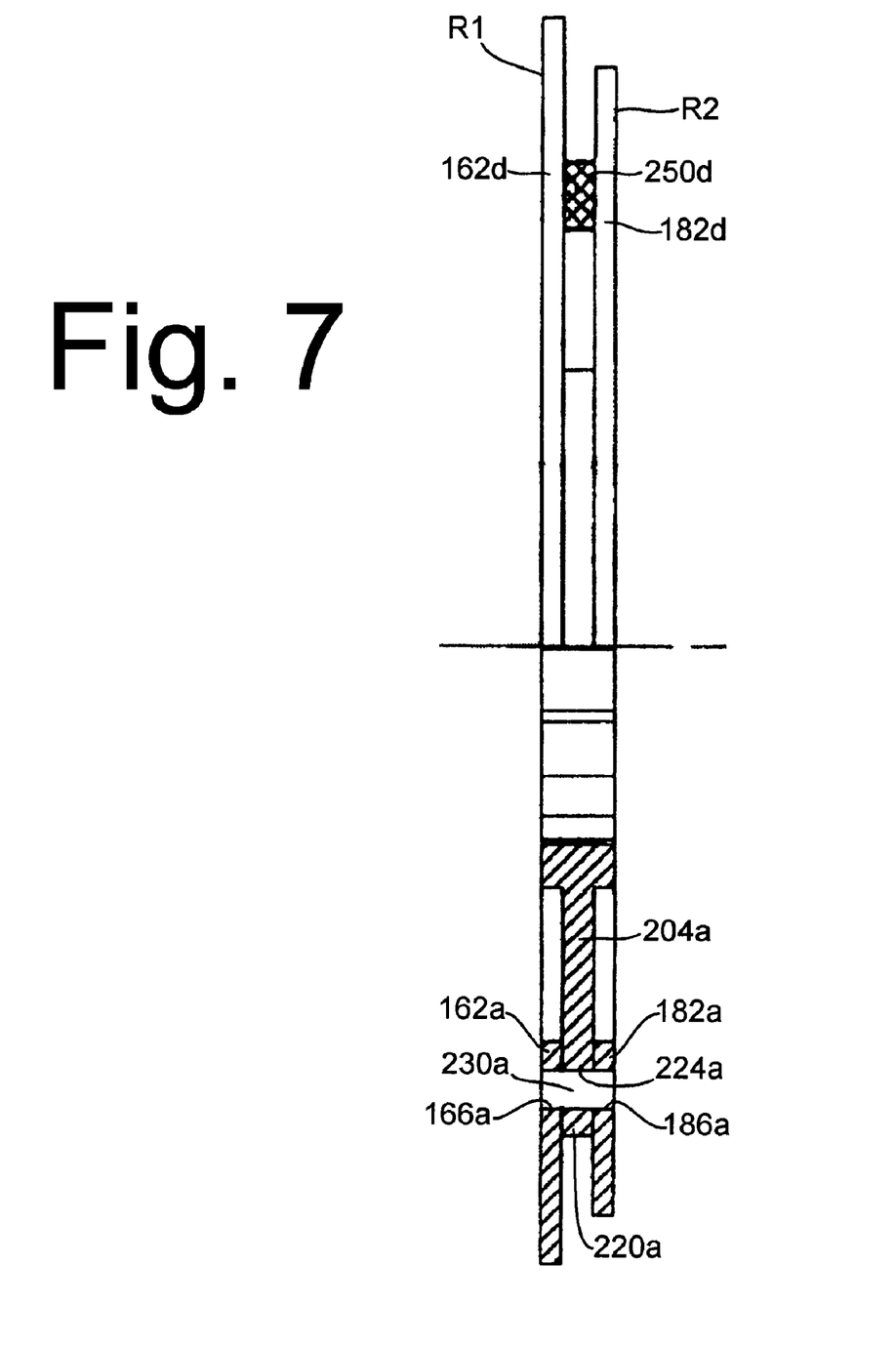
FIG. 7 is a partial cross sectional view of the first and second sprockets connected together by the sprocket support.

Each sprocket mounting arm 204a, 204c and 204e has a respective sprocket mounting portion 220a, 220c and 220e with a respective fastener opening 224a, 224c and 224e. As shown in FIG. 7, sprocket mounting portion 220a of sprocket mounting arm 204a is disposed between mounting portion 162a of rear sprocket R1 and mounting portion 182a of rear sprocket R2. Consequently, sprocket mounting portion 220c of sprocket mounting arm 204c is disposed between mounting portion 162c of rear sprocket R1 and mounting portion 182c of rear sprocket R2, and sprocket mounting portion 220e of sprocket mounting arm 204e is disposed between mounting portion 162e of rear sprocket R1 and mounting portion 182e of rear sprocket R2. Appropriate fasteners 230a, 230c and 230e such as screws, rivets, dowel pins, etc. extend through fastener openings 224a, 224c and 224e in respective sprocket mounting arms 204a, 204c and 204e; through mounting openings 166a, 166c and 166e in respective mounting portions 162a, 162c and 162e of sprocket R1; and through mounting openings 186a, 186c and 186e in respective mounting portions 182a, 182c and 182e of rear sprocket R2 to mount rear sprockets R1 and R2 to sprocket support 150 in a known manner.

Conventionally, sprocket support 150 would include a sprocket mounting arm for each mounting portion 162a-162f and 182a-182f of each rear sprocket R1 and R2. However, in this embodiment, the number of sprocket mounting arms in sprocket support 150 is less than the number of mounting portions in each rear sprocket R1 and R2. As a result, sprocket mounting portions of sprocket support 150 are not disposed between mounting portions 162b, 162d and 162f of rear sprocket R1 and respective mounting portions 182b, 182d and 182f of rear sprocket R2. Instead, as shown in FIG. 7, a reinforcement member 250d is disposed between mounting portion 162d of rear sprocket R1 and mounting portion 182d of rear sprocket R2. Similar reinforcement members (not shown) are disposed between mounting portions 162b and 162f of rear sprocket R1 and respective mounting portions 182b and 182f of rear sprocket R2. The reinforcement members may comprise metal, plastic, a composite resin, or some other material suitable for the purpose.

Figure 8:
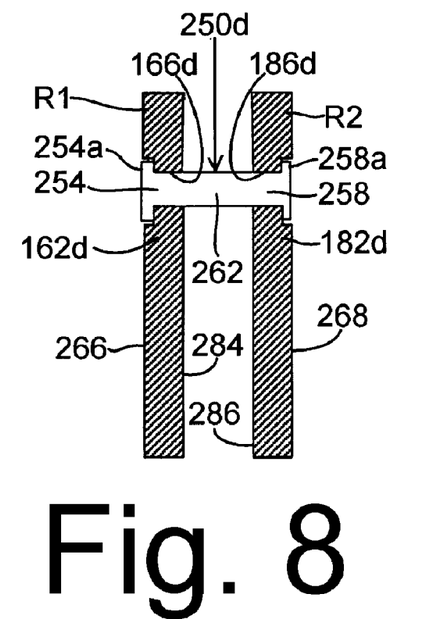
FIG. 8 is a cross sectional view of a particular embodiment of a reinforcement member.

As schematically shown in FIG. 8, each reinforcement member such as reinforcement member 250d may comprise a rivet having a first end portion 254 that extends through mounting opening 166d, a second end portion 258 that extends through mounting opening 186d, and an intermediate portion 262. First end portion 254 has a bulging portion 254a that faces a recessed side surface 266 of rear sprocket R1, and second end portion 258 has a bulging portion 258a that faces a recessed side surface 268 of sprocket R2, wherein recessed side surfaces 266 and 268 face away from each other.

Figure 9:
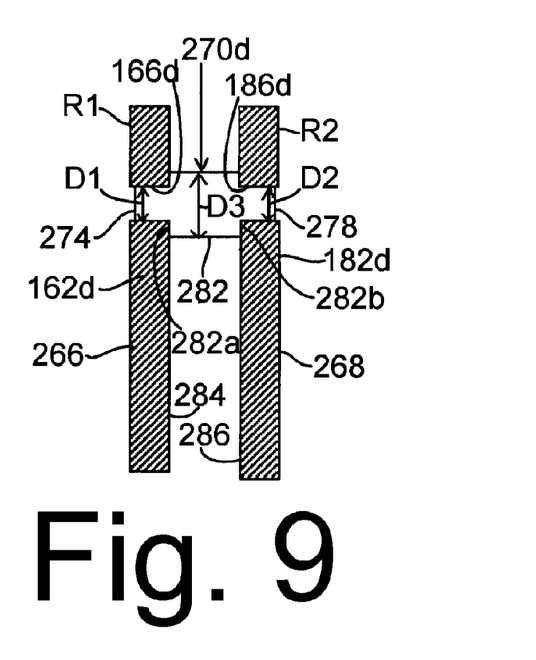
FIGS. 9-13 are cross sectional views of alternative embodiments of reinforcement members.

FIG. 9 is a cross sectional view of another embodiment of a reinforcement member 270d. In this embodiment, reinforcement member 270d has a first end portion 274 that extends into mounting opening 166d, a second end portion 278 that extends into mounting opening 186d, and an intermediate portion 282. A diameter D3 of intermediate portion 282 is greater than both a diameter D1 of first end portion 274 and a diameter D2 of second end portion 278. As a result, an abutment 282a of intermediate portion 282 abuts against a side surface 284 of rear sprocket R1, and an abutment 282b of intermediate portion 282 abuts against a side surface 286 of rear sprocket R2, wherein side surface 284 faces side surface 286.

Figure 10:
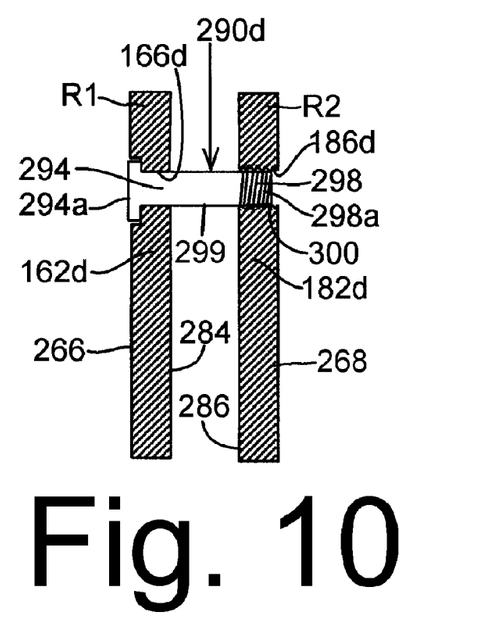

FIG. 10 is a cross sectional view of another embodiment of a reinforcement member 290d. In this embodiment, reinforcement member 290d has a first end portion 294 that extends through mounting opening 166d, a second end portion 298 that extends into mounting opening 186d, and an intermediate portion 299. First end portion 294 has a bulging portion 294a in the form of a screw or bolt head that faces the recessed side surface 266 of rear sprocket R1, and second end portion 298 has a threaded outer peripheral surface 298a that screws into a threaded surface 300 of mounting opening 182d of sprocket R2.

Figure 11:
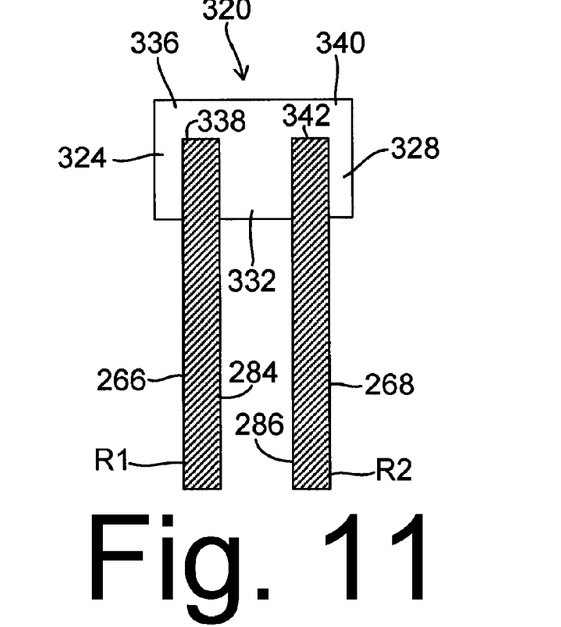

FIG. 11 is a cross sectional view of another embodiment of a reinforcement member 320. In this embodiment, reinforcement member 320 has a first end portion 324 that extends radially inwardly along side surface 266 of rear sprocket R1; a second end portion 328 that extends radially inwardly along side surface 268 or rear sprocket R2; an intermediate portion 332 that extends radially inwardly along side surfaces 284 and 286 of rear sprockets R1 and R2, respectively; a first bridging portion 336 that extends across a radially outwardly facing surface 338 of rear sprocket R1 for connecting first end portion 324 to intermediate portion 332, and a second bridging portion 340 that extends across a radially outwardly facing surface 342 of rear sprocket R2 for connecting second end portion 328 to intermediate portion 332. Radially outwardly facing surfaces 338 and 342 may comprise radially outwardly facing surfaces of the mounting openings in rear sprockets R1 and R2, radially outwardly facing surfaces of rear sprockets R1 and R2 at sprocket teeth 158 or 178 (and their corresponding valleys), or radially outwardly facing surfaces of some other intermediate structure of rear sprockets R1 and R2.

Figure 12:
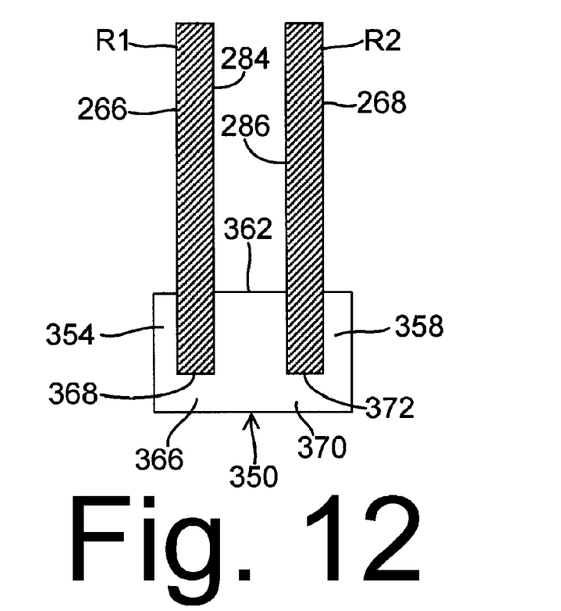

FIG. 12 is a cross sectional view of another embodiment of a reinforcement member 350. In this embodiment, reinforcement member 350 has a first end portion 354 that extends radially outwardly along side surface 266 of rear sprocket R1; a second end portion 358 that extends radially outwardly along side surface 268 or rear sprocket R2; an intermediate portion 362 that extends radially outwardly along side surfaces 284 and 286 of rear sprockets R1 and R2, respectively; a first bridging portion 366 that extends across a radially inwardly facing surface 368 of rear sprocket R1 for connecting first end portion 354 to intermediate portion 362; and a second bridging portion 370 that extends across a radially inwardly facing surface 372 of rear sprocket R2 for connecting second end portion 358 to intermediate portion 362. Radially inwardly facing surfaces 368 and 372 may comprise radially inwardly facing surfaces of the mounting openings in rear sprockets R1 and R2, radially inwardly facing surfaces of rear sprockets R1 and R2 opposite sprocket teeth 158 or 178 (and their corresponding valleys), or radially inwardly facing surfaces of some other intermediate structure of rear sprockets R1 and R2.

Figure 13:
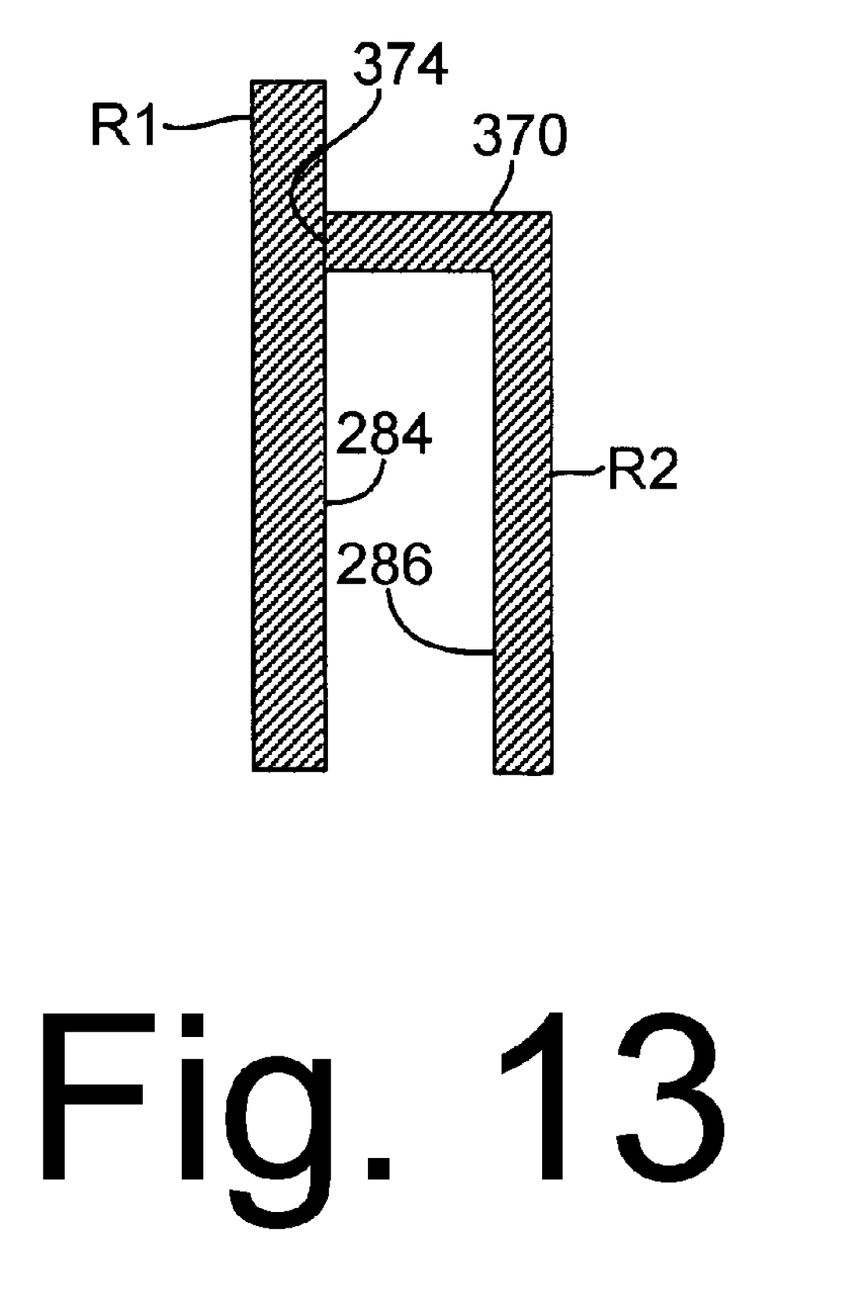

FIG. 13 is a cross sectional view of another embodiment of a reinforcement member 370. In this embodiment, reinforcement member 370 may be integrally formed with at least one of rear sprocket R1 and rear sprocket R2 and extends across the space defined by side surfaces 284 and 286 of rear sprockets R1 and R2. In the specific embodiment shown in FIG. 13, reinforcement member 370 is formed as one piece with sprocket R2, extends perpendicular to sprockets R1 and R2, and forms an abutment 374 that abuts against side surface 284 of sprocket R1.

Figure 14:
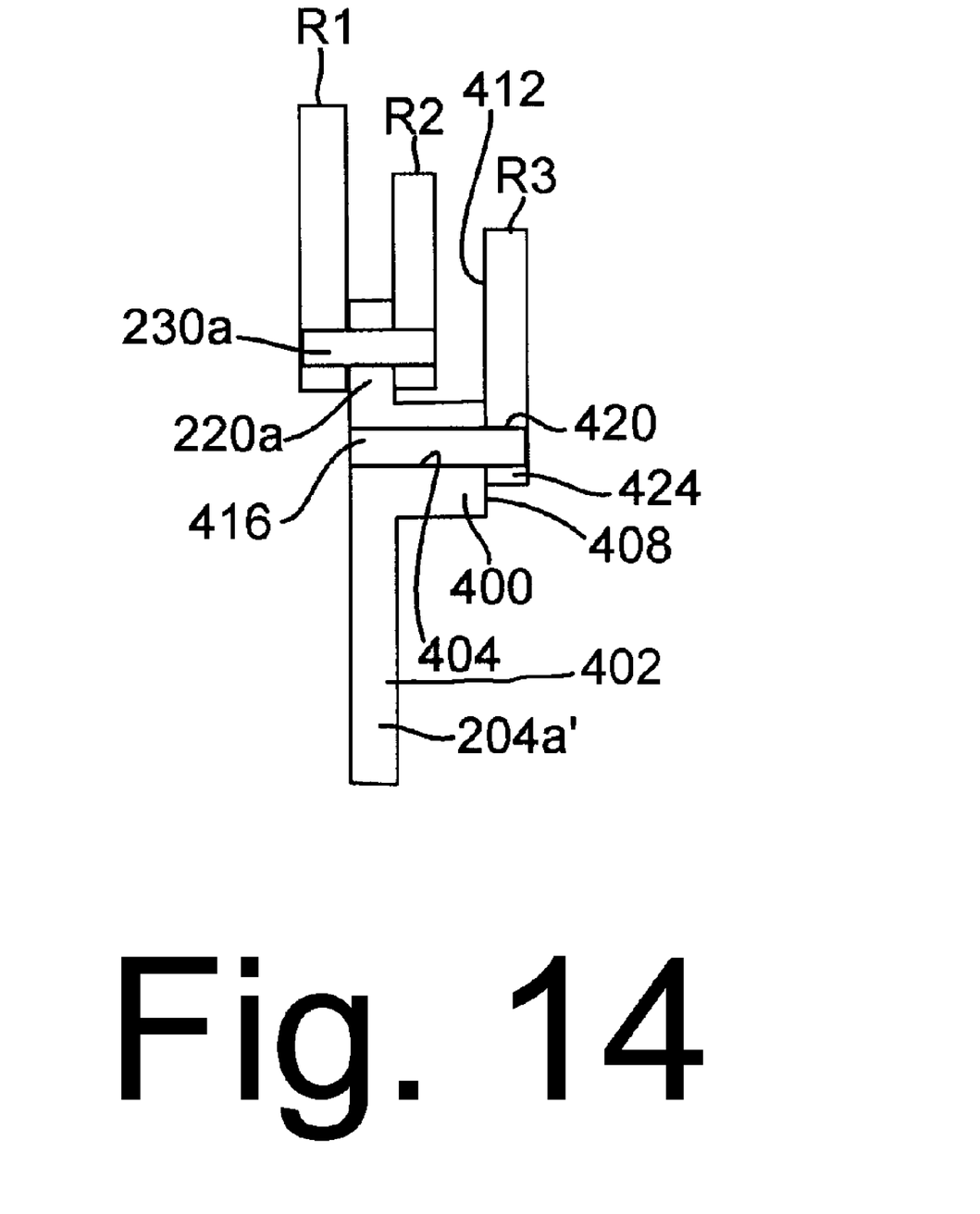
FIG. 14 is a schematic cross sectional view of another embodiment of a sprocket support that supports three sprockets.
Figure 15:
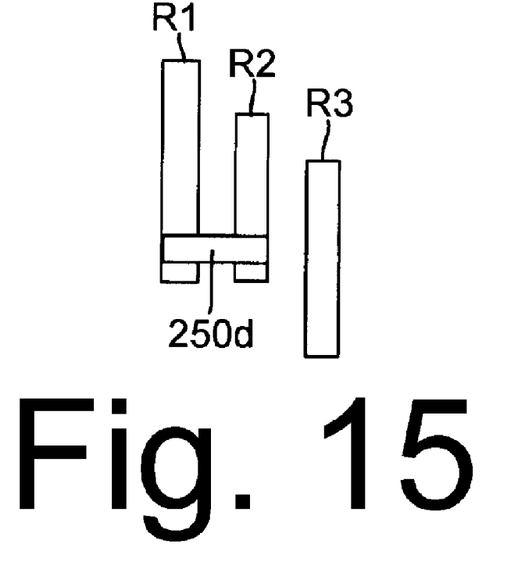
FIG. 15 is a schematic cross sectional view of a reinforcement member disposed between a larger diameter sprocket and an intermediate diameter sprocket.
Figure 16:
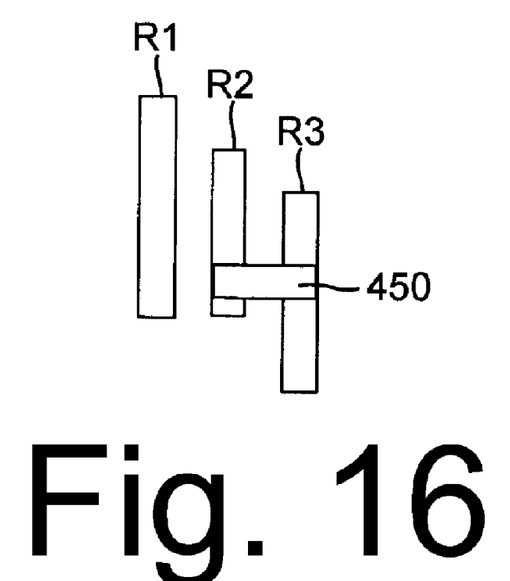
FIG. 16 is a schematic cross sectional view of a reinforcement member disposed between an intermediate diameter sprocket and a smaller diameter sprocket.

FIG. 14 is a cross sectional view of another embodiment of a sprocket mounting arm 204a' of a sprocket support that supports three rear sprockets R1, R2 and R3. Portions of the sprocket support that are the same as the previously described sprocket support 150 are numbered the same and will not be described further. In this embodiment, an annular sprocket mounting boss 400 extends laterally from a side surface 402 of sprocket mounting arm 204a'. Sprocket mounting boss 400 includes a mounting opening 404 and an annular mounting surface 408 that abuts against a side surface 412 of rear sprocket R3. A fastener 416 extends through a mounting opening 420 in a sprocket mounting location in the form of a mounting portion 424 of rear sprocket R3 and through opening 404 in mounting boss 400 to fasten rear sprocket R3 to mounting arm 204a'. Mounting portion 424 of rear sprocket R3 may have a similar or different construction to the mounting portions of rear sprockets R1 and R2, and the number of such mounting portions 424 may vary as desired. As schematically shown in FIG. 15, a reinforcement member 250d may be provided between rear sprockets R1 and R2 between at least one pair of sprocket mounting portions in each of rear sprockets R1 and R2 in the same manner as in the previous embodiments. As schematically shown in FIG. 16, one or more reinforcement members 450 also may be provided between rear sprockets R2 and R3 between at least one pair of sprocket mounting portions in each of rear sprocket R2 and R3. Such reinforcement members 450 may have the same structure as any of the reinforcement members described previously.

While the above is a description of various embodiments of inventive features, further modifications may be employed without departing from the spirit and scope of the present invention. For example, the size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle sprocket apparatus comprising:
   a sprocket support;
   a first single-piece sprocket, wherein the first sprocket is coupled to the sprocket support at a plurality of circumferentially spaced first sprocket mounting locations;
   a second single-piece sprocket, wherein the second sprocket is coupled to the sprocket support at a plurality of circumferentially spaced second sprocket mounting locations;
   wherein the sprocket support is sandwiched between the first sprocket and the second sprocket at the first sprocket mounting locations and at the second sprocket mounting locations; and
   a reinforcement member other than the sprocket support disposed between the first sprocket and the second sprocket;
   wherein the reinforcement member is circumferentially offset from all of the first and second sprocket mounting locations;
   wherein the reinforcement member does not fasten the first sprocket and the second sprocket to the sprocket support; and
   wherein the reinforcement member engages first sprocket and the second sprocket to reinforce an axial position of the first sprocket relative to the second sprocket.

2. The apparatus according to claim 1 wherein the reinforcement member is disposed at a first side surface of the first sprocket and at a second side surface of the second sprocket, wherein the first side surface faces away from the second side surface.

3. The apparatus according to claim 1 wherein the reinforcement member comprises a rivet.

4. The apparatus according to claim 1 wherein the reinforcement member includes a threaded portion that screws into at least one of the first sprocket and the second sprocket.

5. The apparatus according to claim 1 wherein the support member comprises:
   a mounting boss having a central opening; and
   a plurality of radially outwardly extending mounting arms, wherein each mounting arm has a sprocket mounting portion disposed between the first sprocket and the second sprocket.

6. The apparatus according to claim 1 wherein the reinforcement member comprises a first end portion that extends into an opening in a side surface of the first sprocket.

7. The apparatus according to claim 6 wherein the reinforcement member comprises a second end portion that extends into an opening in a side surface of the second sprocket.

8. The apparatus according to claim 7 wherein the reinforcement member includes an intermediate portion having a diameter greater than at least one of the first end portion and the second end portion.

9. The apparatus according to claim 8 wherein the intermediate portion has a diameter greater than both the first end portion and the second end portion.

10. The apparatus according to claim 1 wherein the reinforcement member is integrally formed with one of the first sprocket and the second sprocket.

11. The apparatus according to claim 10 wherein the first sprocket comprises a larger diameter sprocket, and wherein the second sprocket comprises a smaller diameter sprocket.

12. The apparatus according to claim 11 wherein the reinforcement member is integrally formed with the smaller diameter sprocket.

13. The apparatus according to claim 12 wherein the reinforcement member is one piece with the smaller diameter sprocket.

14. The apparatus according to claim 12 wherein the reinforcement member forms an abutment that abuts against a side surface of the larger diameter sprocket.

15. The apparatus according to claim 1 wherein the reinforcement member is disposed at a first radially facing surface of the first sprocket and at a second radially facing surface of the second sprocket.

16. The apparatus according to claim 15 wherein at least one of the first radially facing surface and the second radially facing surface faces radially outwardly.

17. The apparatus according to claim 15 wherein at least one of the first radially facing surface and the second radially facing surface faces radially inwardly.

18. The apparatus according to claim 15 wherein the reinforcement member is disposed at a first side surface of the first sprocket and at a second side surface of the second sprocket, wherein the first side surface faces away from the second side surface.

19. The apparatus according to claim 1 further comprising:
a third sprocket coupled to the sprocket support at a plurality of circumferentially spaced third sprocket mounting locations; and
a second reinforcement member disposed between the second sprocket and the third sprocket between a pair of the second sprocket mounting locations and between a pair of the third sprocket mounting locations.

20. The apparatus according to claim 19 wherein the first sprocket comprises a larger diameter sprocket, wherein the second sprocket comprises an intermediate diameter sprocket, and wherein the third sprocket comprises a smaller diameter sprocket.

21. The apparatus according to claim 1 wherein each reinforcement member consists of only one unitary member that provides the only reinforcement between the first sprocket and the second sprocket.

* * * * *